US012467485B2

(12) United States Patent
Uruena Montoya et al.

(10) Patent No.: US 12,467,485 B2
(45) Date of Patent: Nov. 11, 2025

(54) HYDRAULIC PUMP WITH ELECTRONIC ADJUSTABLE PRESSURE SETTING

(71) Applicant: Milwaukee Electric Tool Corporation, Brookfield, WI (US)

(72) Inventors: Jean Mauricio Uruena Montoya, Wauwatosa, WI (US); Mathew R. Rentmeester, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 0 days.

(21) Appl. No.: 18/407,283

(22) Filed: Jan. 8, 2024

(65) Prior Publication Data

US 2024/0229832 A1 Jul. 11, 2024

Related U.S. Application Data

(60) Provisional application No. 63/478,838, filed on Jan. 6, 2023.

(51) Int. Cl.

| | |
|---|---|
| ***F15B 15/20*** | (2006.01) |
| ***F04B 17/03*** | (2006.01) |
| ***F04B 49/08*** | (2006.01) |
| *F04B 49/06* | (2006.01) |

(52) U.S. Cl.

CPC .............. *F15B 15/20* (2013.01); *F04B 17/03* (2013.01); *F04B 49/08* (2013.01); *F04B 49/065* (2013.01)

(58) Field of Classification Search

CPC ................................ B25F 5/005; B26B 15/00

See application file for complete search history.

(56) References Cited

U.S. PATENT DOCUMENTS

| | | | | |
|---|---|---|---|---|
| 6,092,290 | A * | 7/2000 | Vogelsanger .......... | B23D 17/00 30/228 |
| 7,635,253 | B2 | 12/2009 | Garcia-Ortiz | |
| 9,181,943 | B2 | 11/2015 | Blackson | |
| 10,151,331 | B2 | 12/2018 | McDonald et al. | |
| 10,688,646 | B2 | 6/2020 | Frenken | |
| 2011/0008187 | A1* | 1/2011 | Infanger ................ | F15B 13/06 417/280 |
| 2017/0252911 | A1* | 9/2017 | Barezzani .............. | F04B 17/03 |
| 2019/0154029 | A1 | 5/2019 | Jochman | |
| 2019/0326838 | A1 | 10/2019 | Dion et al. | |
| 2020/0001446 | A1* | 1/2020 | Ballard .................. | F04B 9/042 |
| 2021/0172436 | A1 | 6/2021 | Daniels et al. | |

* cited by examiner

*Primary Examiner* — Thomas E Lazo

(74) *Attorney, Agent, or Firm* — Quarles & Brady LLP

(57) ABSTRACT

A hydraulic pump and a method of operating a double acting hydraulic pump is provided. The method includes retrieving a current operating pressure from memory of a controller, controlling a pump assembly to pump hydraulic fluid from a bladder through one of two work ports to a hydraulic tool at the current operating pressure, and updating the current operating pressure based on input from a user interface.

17 Claims, 5 Drawing Sheets

HYDRAULIC PUMP WITH ELECTRONIC ADJUSTABLE PRESSURE SETTING

RELATED APPLICATIONS

This application claims priority under 35 U.S.C. § 119 to U.S. Provisional Patent Application No. 63/478,838 filed on Jan. 6, 2023, the entire contents of which is incorporated herein by reference.

FIELD

The present disclosure relates generally to hydraulic pumps and systems, and more particularly to systems and methods for a hydraulic pump for use with a hydraulic tool.

BACKGROUND

Hydraulic tools can be used to provide an operator with a mechanical advantage for performing work on a workpiece. For example, a hydraulic tool may be a cutting device having blades for cutting an object into separate parts. As another example, a hydraulic tool may be a crimping device for making crimping connections, thereby conjoining two separate pieces by deforming one or both pieces in a way that causes them to hold together. As yet another example, a hydraulic tool may be a lifting cylinder for lifting a workpiece and/or a pipe bender for bending a workpiece.

In general, a hydraulic tool is coupled to a hydraulic pump, which is operable to pressurize a hydraulic fluid. The hydraulic pump transfers the pressurized hydraulic fluid to a cylinder in the hydraulic tool, and the hydraulic tool uses the pressurized hydraulic fluid from the hydraulic pump to perform the work, e.g., cutting, crimping, lifting, etc. The hydraulic pump, therefore, requires mechanisms to pressurize the hydraulic fluid, maintain the pressure, and release the pressure.

SUMMARY

In some aspects, a hydraulic pump is provided. The hydraulic pump includes a bladder that stores hydraulic fluid and a manifold in fluid communication with the bladder and including a work port. The hydraulic pump also includes a pump assembly that pumps hydraulic fluid from the bladder through the work port, a user interface, and a controller in communication with the user interface and the pump assembly. The controller is configured to store a current operating pressure in memory, update the current operating pressure based on input from the user interface, and control the pump assembly to pump the hydraulic fluid from the bladder through the work port at the current operating pressure.

In another aspect, a method of operating a double acting hydraulic pump including a pump assembly, a bladder, two work ports, a controller, and a user interface is provided. The method includes retrieving a current operating pressure from memory of the controller, controlling the pump assembly to pump hydraulic fluid from the bladder through one of the two work ports to a hydraulic tool at the current operating pressure, and updating the current operating pressure based on input from the user interface.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

DETAILED DESCRIPTION

Figure 1:
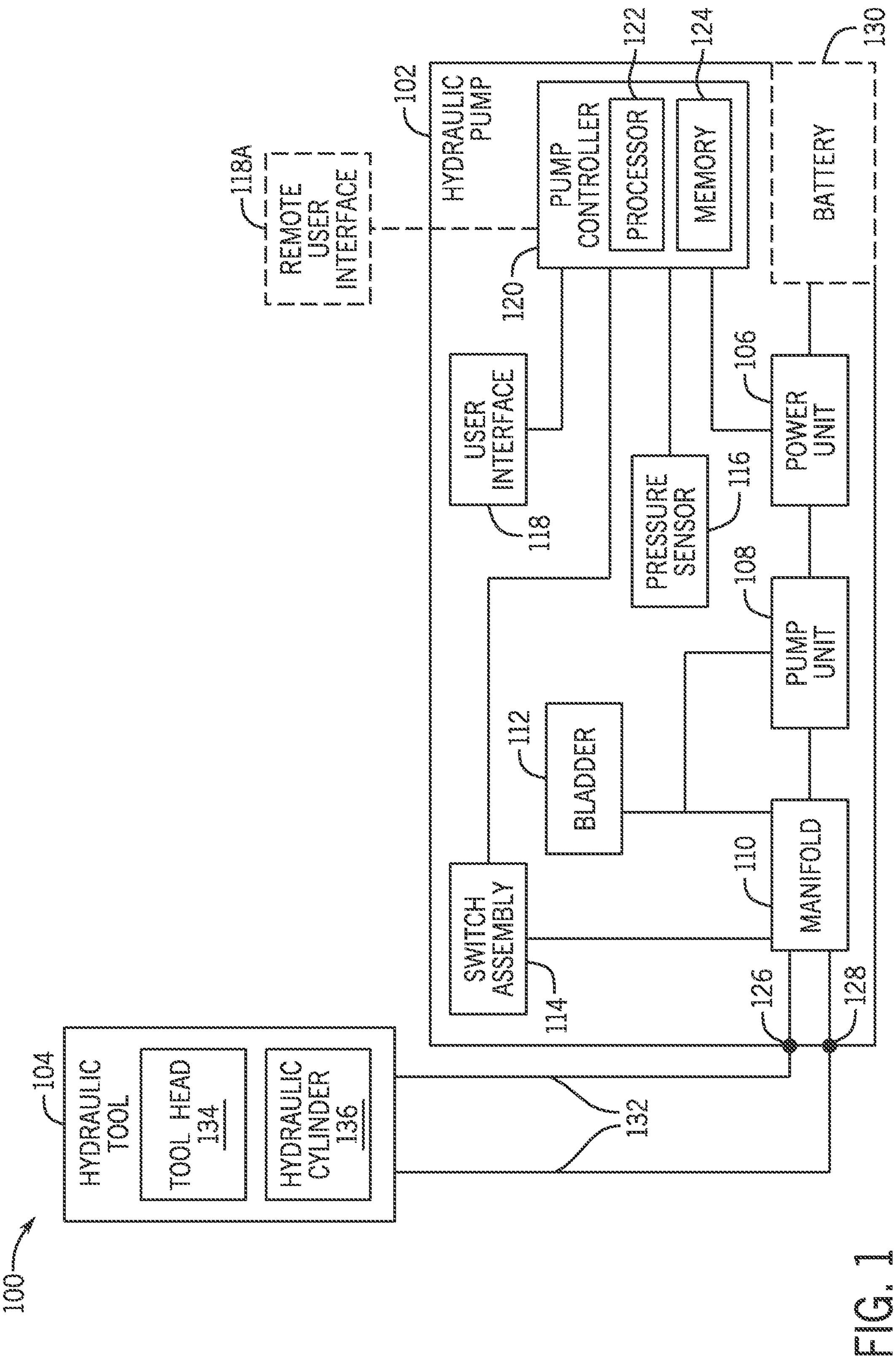
FIG. 1 is a schematic diagram of a hydraulic power tool system including a hydraulic pump according to some embodiments.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As used herein, unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Generally, some embodiments provide a double acting hydraulic pump for use with a hydraulic tool and including an electronic adjustable pressure setting. For example, FIG. 1 illustrates a hydraulic power tool system 100 including a hydraulic pump 102, according to some embodiments, and a hydraulic tool 104. Generally, the hydraulic pump 102 can be operated to provide a pressurized fluid (e.g., a hydraulic oil) to actuate the hydraulic tool 104. For example, as shown in FIG. 1, the hydraulic pump 102 can include a power unit 106, a pump assembly 108, a manifold 110, a bladder 112, a switch assembly 114, a pressure sensor 116, a user interface 118, a pump controller 120 with a processor 122 and memory 124, a first work port 126, a second port 128, and a removable power source or battery 130. The hydraulic pump 102 can be removably coupled to the hydraulic tool 104 via fluid supply lines 132, such as tubing, extending from the work ports 126, 128. Furthermore, the hydraulic tool 104 can include a tool head 134 and a hydraulic cylinder 136.

In operation, the power unit 106 can be powered by the battery 130 and controlled by the pump controller 120, in response to user input from the user interface 118, to drive the pump assembly 108. The pump assembly 108 pumps pressurized fluid from the bladder 112 through the manifold 110, one of the work ports 126, 128, and one of the fluid supply lines 132, to the hydraulic tool 104. Within the hydraulic tool 104, the pressurized fluid pushes the hydraulic cylinder 136, which actuates the tool head 134. For example, the tool head 134 may include a set of jaws (not shown), and the hydraulic cylinder 136 includes a piston (not shown) that moves one or both jaws toward each other, causing a crimping or cutting operation. In another example, the tool head 134 includes a movable lift structure (not shown), and the hydraulic cylinder 136 moves the movable lift structure to change an elevation of a workpiece supported by the movable lift structure. Other examples are possible such as, but not limited to, tool heads 134 with moveable elements (e.g., a bend die and/or a bend roll) that can move a workpiece relative to a stationary element (e.g., a stationary die and/or a stationary roll) to change a shape of the workpiece.

Once an operation is completed, the pump assembly 108 can pump pressurized fluid from the bladder 112 through the manifold 110, the other one of the work ports 126, 128, and the other one of the fluid supply lines 132, to the hydraulic tool 104, thus pushing the hydraulic cylinder 136 in another direction to reverse its prior movements. In this manner, the hydraulic pump 102 is a double action pump. That is, the hydraulic pump 102 includes two work ports 126, 128, capable of forcing fluid in two directions and, thus, can provide the hydraulic tool with controlled pushing and pulling forces. However, in some embodiments, the hydraulic pump 102 can be a single action hydraulic pump 102, that is, where fluid is controlled in a single direction. Accordingly, while the concepts are described herein with respect to a double action pump illustrated in FIGS. 1-4, they may be equally applied to a single action pump.

Figure 2:
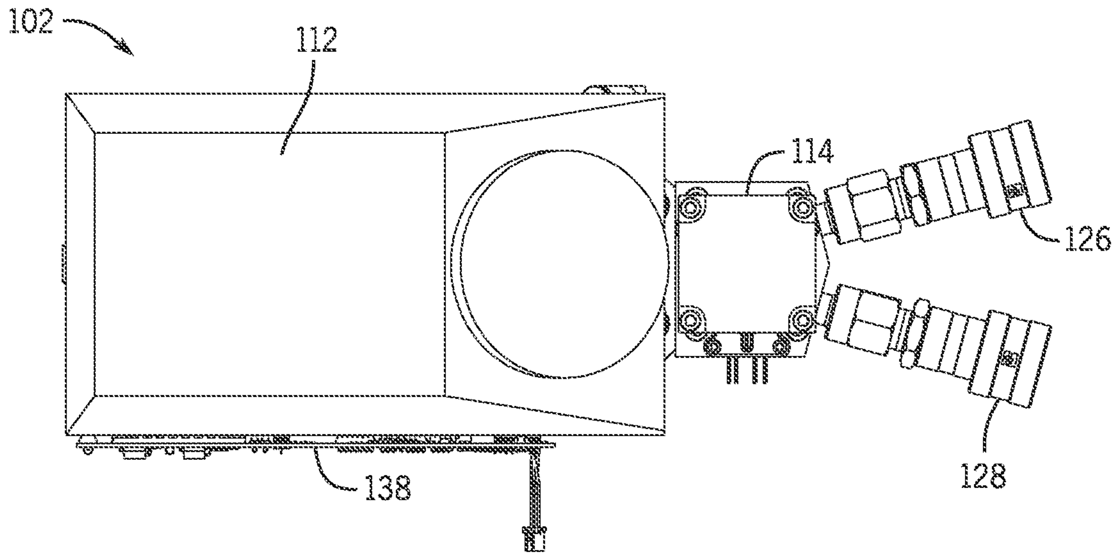
FIG. 2 is a top view of a hydraulic pump according to some embodiments, with portions of a housing removed.
Figure 3:
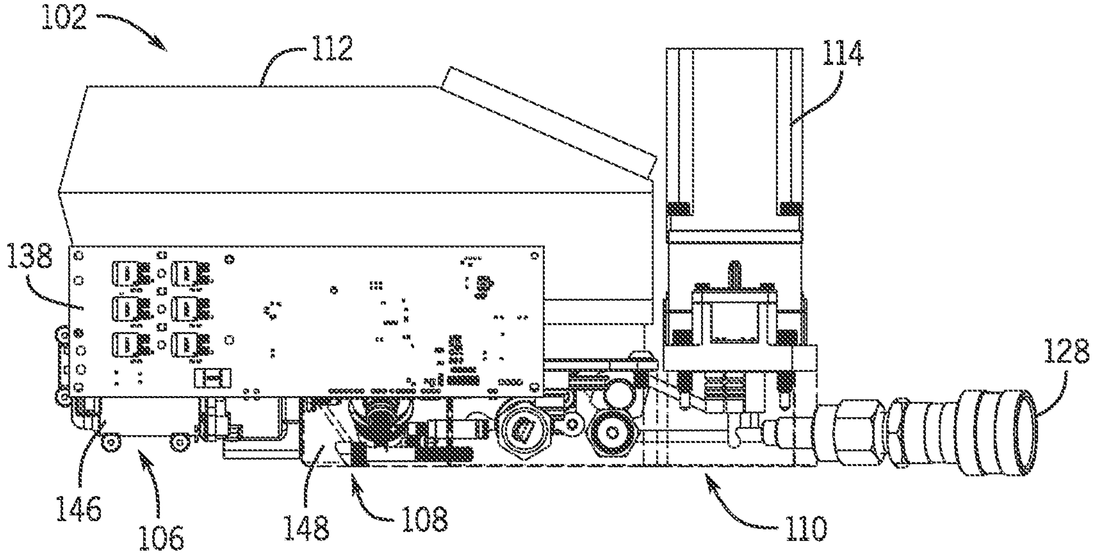
FIG. 3 is a side view of the hydraulic pump of FIG. 2.
Figure 4:
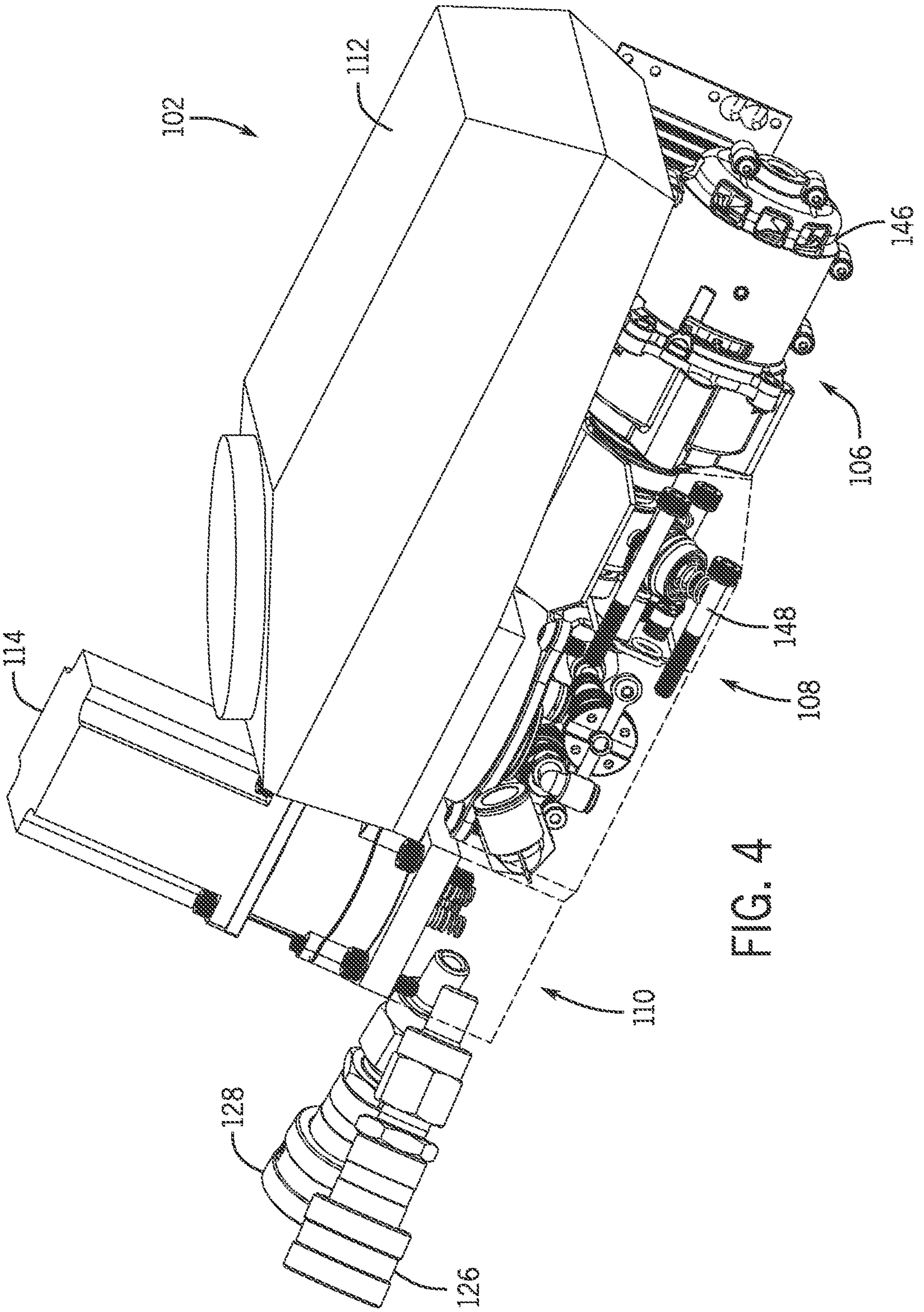
FIG. 4 is an isometric view of the hydraulic pump of FIG. 2.

FIGS. 2-4 further illustrate the hydraulic pump 102 according to some embodiments. As shown in FIGS. 2-4, the hydraulic pump 102 can include the work ports 126, 128, the power unit 106, the pump assembly 108, the manifold 110 (shown in detail in FIG. 3), the bladder 112, the switch assembly 114, and a printed circuit board 138 (e.g., including the controller 120 of FIG. 1). Though not shown in FIGS. 2-4, the hydraulic pump 102 can further include a housing that houses at least the power unit 106, the pump assembly 108, the manifold 110, the switch assembly 114, the printed circuit board 138, and/or all or a portion of the bladder 112. The housing can also include a battery terminal configured to receive a battery 130, and a user interface 118.

Figure 5:
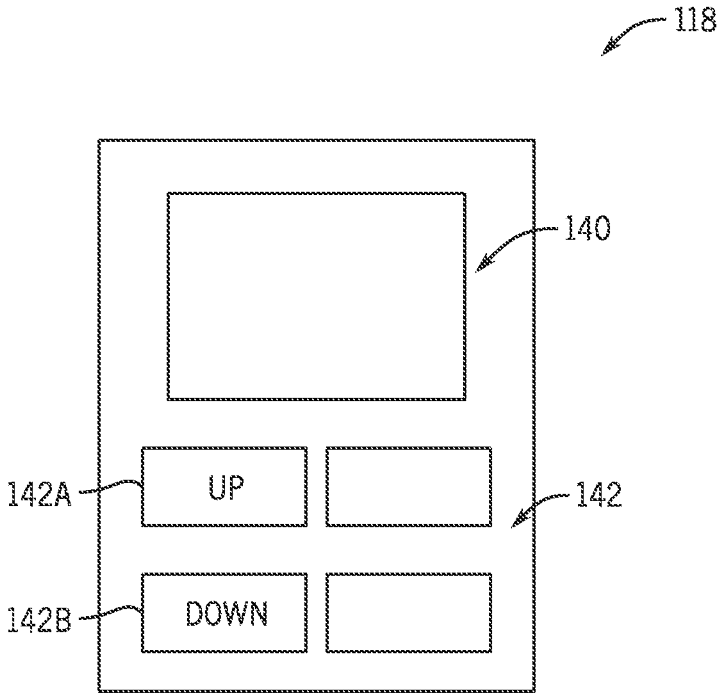
FIG. 5 is a schematic diagram of a user interface of a hydraulic pump according to some embodiments.

In some embodiments, the user interface 118 can include a display and/or inputs configured to receive feedback from an operator, such as one or more buttons, keypads, dials, triggers, switches, wheels, or the like. FIG. 5 illustrates an example user interface 118 including a display 140 and one or more buttons 142, such as at least an "up" button 142A and a "down" button 142B. In some embodiments, the display 140 can be separate from physical buttons 142. In other embodiments, the display 140 can incorporate electronic buttons 142, and, for example, can be an LCD touch screen. Additionally, in some embodiments, the user interface 118 can be integrated into the housing of the hydraulic pump 102 (e.g., on an outer surface of the housing, such that user inputs are provided at the housing). In other embodiments, the user interface 118 can be a separate element coupled to the housing, and the controller 120, via a wired connection or wireless connection (e.g., such that user inputs can be provided remote from the housing). In some embodiments, the housing may include a seat upon which the user interface 118 can be mounted and/or stored.

Furthermore, referring back to FIG. 1, in some embodiments, the hydraulic power tool system 100 can additionally or alternatively include a remote user interface 118A. The remote user interface 118A can communicate with the controller 120 via a wireless or wired connection. In some embodiments, the remote user interface 118A can be provided through a software application on a mobile phone, tablet, or computer, thereby providing a display and inputs via the mobile phone, tablet, or computer. Both the user interface 118 and the remote user interface 118A can include similar features, such as similar displays and inputs, thus allowing an operator to view the same display outputs from or provide user input to the user interface 118 or the remote user interface 118A. As such, any reference to the user interface 118 throughout the disclosure may equally apply to the remote user interface 118A unless otherwise noted.

Referring now to FIGS. 1, 3, and 4, the power unit 106 can include a motor 146 configured to convert electrical energy to rotational motion in order to operate the pump assembly 108. In some embodiments, the power unit 106 can comprise a variable speed motor 146. Further, in some embodiments, the power unit 106 can comprise a brushless direct current (DC) motor 146 with a planetary gearset.

The power unit 106 can be powered by a power source, such as the battery 130, as shown in FIG. 1. The hydraulic pump 102 can, therefore, be considered a cordless pump as it is battery operated. In some embodiments, the battery 130 can be an 18-volt battery. Furthermore, in some embodiments, the battery 130 can be removable from the hydraulic pump 102. For example, as noted above, the hydraulic pump 102 can include a battery terminal, onto which the battery 130 can be removably coupled. As a result, the battery 130 can be removed from the hydraulic pump 102 and recharged and/or replaced, when necessary. In some embodiments, the hydraulic pump 102 can additionally or alternatively include a power cord configured to be plugged into a power source, allowing an alternative to battery power.

Furthermore, the power unit 106 can be controlled by the pump controller 120. As such, the pump controller 120 can be in communication with the motor 146. The pump controller 120 can be implemented using hardware, software, and/or firmware. For example, as shown in FIG. 1, the pump controller 120 can include one or more processors 122 and memory 124, e.g., a non-transitory computer readable memory that stores machine language instructions or other executable instructions. The instructions, when executed by the one or more processors 122, can cause the pump controller 120 to carry out various operations of the hydraulic pump 102. For example, the memory 124 can include instructions that, when executed by the processor(s) 122, cause the pump controller 120 to operate the electric motor 146 in response to user input from an operator. Such user input can be the operator depressing a button 142 on the user interface 118.

The motor 146 (or, more generally, the power unit 106) can be operated to actuate the pump assembly 108 in order to pump fluid to the hydraulic tool 104 at an increasing fluid pressure until reaching a preset operating pressure. For example, as shown in FIGS. 1, 3, and 4, the pump assembly 108 can include a pump 148 coupled to the power unit 106. The pump 148 withdraws fluid out of the bladder 112 and supplies pressurized fluid through the manifold 110 to a respective work port 126, 128, as controlled by the switch assembly 114.

More specifically, as shown in FIGS. 1-4, the bladder 112 operates as a reservoir for storing hydraulic fluid (e.g., hydraulic oil). The bladder 112 can store the hydraulic fluid at a low pressure level, such as atmospheric pressure or slightly higher than atmospheric pressure (e.g., about 30 psi to about 70 psi in some embodiments). As noted above, the pump assembly 108 withdraws fluid from the bladder 112 and forces pressurized fluid through a fluid supply line 132 into the hydraulic tool 104.

Additionally, the fluid travels through the manifold 110 between the pump assembly 108, the bladder 112, and the work ports 126, 128. The switch assembly 114 can be coupled to the manifold 110 to provide automated fluid directional control through the manifold 110. That is, the switch assembly 114 can be controlled by the controller 120 to change a direction of pressurized fluid flow through the first work port 126 and the second port 128, for example, based on user input through the user interface 118.

Furthermore, in some embodiments, an operator can set or adjust an operating pressure of the fluid flowing to the hydraulic tool 104. That is, the hydraulic pump 104 can include an electronic adjustable pressure setting through the user interface 118. For example, in some embodiments, the controller 120 can monitor a fluid pressure exiting the hydraulic pump 102, or along another location within hydraulic pump 12, via the pressure sensor 116. For example, the pressure sensor 116 can be located at a position within a fluid pathway of the hydraulic fluid to measure a pressure of the hydraulic fluid entering the work ports 126, 128, exiting the work ports 126, 128, entering the manifold 110, exiting the bladder 112, or along another point.

Through such monitoring, the controller 120 can operate the pump assembly 108, one or more valves within the manifold 110, and/or the switch assembly 114 to provide pressurized fluid to a hydraulic tool 104 up to, but not exceeding, a set operating pressure that is stored in the memory 124. That is, the controller 120 can control the pump assembly 108, the switch assembly 114, and/or the manifold 110 to pump the hydraulic fluid from the bladder 112 through the work port 126, 128 until the current operating pressure is reached. For example, in some embodiments, the controller 120 can stop the motor 146 when the set operating pressure is reached, adjust the switch assembly 114 when the set operating pressure is reached, or perform another action when the set operating pressure is reached. An operator can also update and save a new set operating pressure in the memory 124 through the user interface 118. Additionally, in some embodiments, a plurality of operating pressures can be saved in the memory 124 and a user can select a set operating pressure from one of the saved operating pressures.

Figure 6:
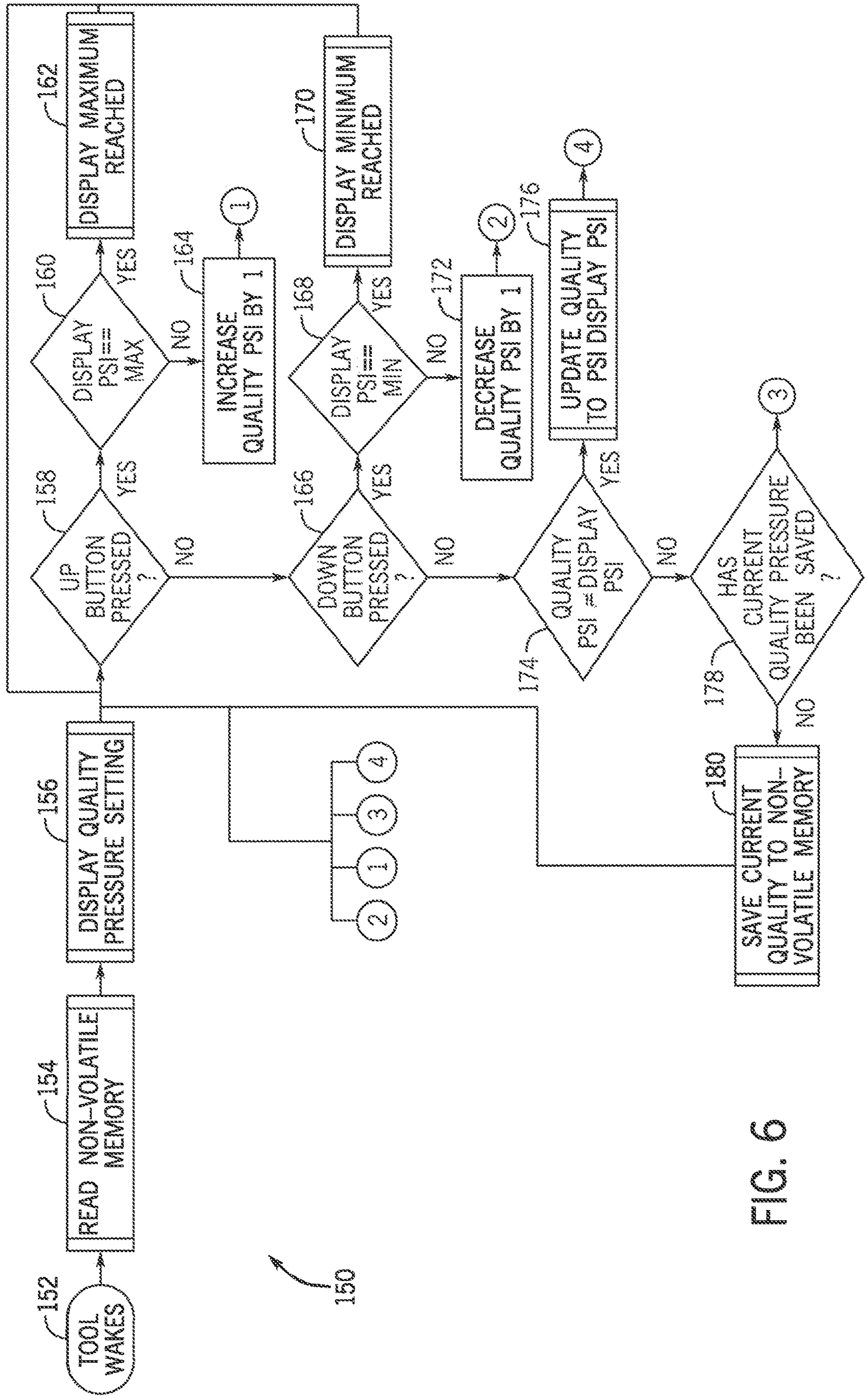
FIG. 6 is a flow diagram of a method of adjusting a pump pressure setting in a hydraulic pump according to some embodiments.

FIG. 6 illustrates an example method 150 for adjusting a pump pressure setting according to some embodiments. In some embodiments, the method 150 of FIG. 6 can be executed by the pump controller 120 (e.g., can be stored in the memory 124 to be executed by the processor 122 of the pump controller 120). It should also be noted that, while certain steps are illustrated in FIG. 6 and described below in a particular order, in some embodiments, the steps may be executed in a different order than that shown and described, or more or fewer steps may be executed.

As shown in FIG. 6, upon waking at step 152, the controller 120 can obtain from the memory 124 a current pressure setting at step 154. The controller 120 can display the current pressure setting (e.g., a "displayed pressure setting") at step 156, for example, via the display 140 of the user interface 118 (or, as noted above, through the remote user interface 118A via a software application on a mobile phone, tablet, or computer in communication with the controller 120). The controller 120 can determine if an operator has pressed an up button 142A on the user interface at step 158. If so, the controller 120 determines, at step 160, if the displayed pressure setting is a maximum operating pressure. For example, in some embodiments, the hydraulic pump 102 can have a maximum operating pressure of about 10,500 pounds per square inch (PSI) or about 10,000 PSI, or another pressure. If the displayed pressure setting is the maximum operating pressure, the controller 120 can provide a message via the display 140 that the maximum operating pressure has been reached at step 162 and return to step 158. If, at step 160, the displayed pressure setting is not equal to the maximum operating pressure, the controller 120 increases the current pressure setting by 1 PSI (or another number) at step 164 and returns to step 158.

If, at step 158, an operator has not pressed the up button 142A, the controller 120 determines if an operator has pressed the down button 142B at step 166. If so, the controller 120 determines, at step 168, if the displayed pressure setting is a minimum operating pressure. If the displayed pressure setting is the minimum operating pressure, the controller 120 provides a message via the display 140 that the minimum operating pressure has been reached at step 170 and returns to step 158. In some embodiments, the maximum and minimum operation pressures can be preset (e.g., factory-set) pressure settings set within the memory 124. If, at step 168, the displayed pressure setting is not equal to the minimum operating pressure, the controller 120 decreases the current pressure setting by 1 PSI (or another number) at step 172 and returns to step 158.

If, at step 166, an operator has not pressed the down button 142B, the controller 120 determines if the current pressure setting is not equal to the displayed pressure setting on the user interface 118 at step 174. For example, such an event would occur if the controller 120 had increased the current pressure setting at step 160 or decreased the current pressure setting at step 172. If so, the controller 120 updates and displays the current pressure setting at step 176, thus setting the current pressure setting as a new displayed pressure setting, and returns to step 158. If, at step 174, the displayed pressure setting is equal to the current pressure setting, the controller 120 determines if the current pressure setting has been saved at step 178. If so, the controller 120 returns to step 158. If not, the controller 120 saves the current pressure setting to memory 124 at step 180 and returns to step 158.

The controller 120 can continue returning to step 158 and looping through the method 150 of FIG. 6 until the hydraulic pump 102 is put to sleep. For example, the controller 120 can put the hydraulic pump 102 to sleep based on the user providing a command through the user interface 118. As another example, the controller 120 can put the hydraulic pump 102 to sleep automatically, such as when no inputs have been received after a set time period.

By the term “about” or “substantially” with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The invention claimed is:

1. A hydraulic pump comprising:
- a bladder that stores hydraulic fluid;
- a manifold in fluid communication with the bladder and including a work port;
- a pump assembly that pumps hydraulic fluid from the bladder through the work port;
- a user interface including a user input having an up button and a down button; and
- a controller in communication with the user interface and the pump assembly, the controller:
  - storing a current operating pressure in memory;
  - updating the current operating pressure based on input from the user interface; and
  - controlling the pump assembly to pump the hydraulic fluid from the bladder through the work port until the current operating pressure is reached.

2. The hydraulic pump of claim 1, further comprising a pressure sensor in communication with the controller, the pressure sensor sensing a pressure of the hydraulic fluid exiting the work port.

3. The hydraulic pump of claim 1, further comprising a switch assembly in communication with the manifold and controlled by the controller.

4. The hydraulic pump of claim 3, wherein the work port includes a first work port and a second work port, wherein the controller controls the switch assembly to control a direction of flow of the hydraulic fluid through the first work port and the second work port.

5. The hydraulic pump of claim 1, wherein the user interface includes a display.

6. The hydraulic pump of claim 5, wherein the controller displays the current operating pressure via the display.

7. The hydraulic pump of claim 1, wherein the controller maintains the current operating pressure when the up button is pressed if the current operating pressure is equal to a maximum operating pressure.

8. The hydraulic pump of claim 1, wherein the user interface is a remote user interface that wirelessly communicates with the controller.

9. A method of operating a double acting hydraulic pump including a pump assembly, a bladder, two work ports, a controller, and a user interface, the method comprising:
- retrieving a current operating pressure from memory of the controller;
- controlling the pump assembly to pump hydraulic fluid from the bladder through one of the two work ports to a hydraulic tool until the current operating pressure is reached; and
- updating the current operating pressure based on input from the user interface by increasing the current operating pressure when an up button of the user interface is pressed and decreasing the current operating pressure when a down button of the user interface is pressed.

10. The method of claim 9, further comprising sensing a pressure of the hydraulic fluid exiting the hydraulic pump.

11. The method of claim 9, further comprising displaying the current operating pressure via a display of the user interface.

12. The method of claim 11, further comprising displaying the current operating pressure via the display when the hydraulic pump wakes.

13. The method of claim 9, further comprising maintaining the current operating pressure when the up button is pressed and the current operating pressure is equal to a maximum operating pressure.

14. The method of claim 13, further comprising displaying that the maximum operating pressure has been reached when the up button is pressed and the current operating pressure is equal to the maximum operating pressure.

15. The method of claim 9, further comprising maintaining the current operating pressure when the down button is pressed and the current operating pressure is equal to a minimum operating pressure.

16. The method of claim 15, further comprising displaying that the minimum operating pressure has been reached when the down button is pressed and the current operating pressure is equal to the minimum operating pressure.

17. The method of claim 9, further comprising saving a new current operating pressure to the memory when the current operating pressure is updated based on the input from the user interface.

* * * * *